United States Patent Office 3,696,092
Patented Oct. 3, 1972

3,696,092
PROCESS FOR THE CHEMICAL MODIFICATION OF POLYMERS CONTAINING ACTIVE HYDROGEN ATOMS BY REACTING SUCH WITH A SULFONAMIDE COMPOUND
Giuliana C. Tesoro, 278 Clinton Ave., Dobbs Ferry, N.Y. 10522
No Drawing. Original application July 23, 1964, Ser. No. 384,780, now Patent No. 3,528,964, dated Sept. 15, 1970. Divided and this application July 23, 1970, Ser. No. 63,987
Int. Cl. C08b *11/00*
U.S. Cl. 260—231 A                7 Claims

ABSTRACT OF THE DISCLOSURE

Polymers containing active hydrogen atoms, as determined by the Zerewitinoff method, are reacted with various sulfonamide compounds in the presence of suitable catalysts to improve the properties of said polymers.

---

This is a divisional application of applicant's copending application Ser. No. 384,780, filed July 23, 1964, which is now U.S. Pat. 3,528,964.

The present invention relates to the chemical modification of polymers containing active hydrogen atoms in the molecules of the polymers, by treating them with various sulfonamide compounds in the presence of suitable catalysts. The invention also relates to modified polymers of improved properties produced by the aforementioned treatment. More particularly, the present invention relates to the treatment of polymers containing hydroxyl groups with various reactive sulfonamide compounds to form new stable chemical bonds with the aforementioned polymers and thereby to produce products having permanently enhanced and improved physico-chemical properties.

Many processes are known in the art whereby certain desired properties can be obtained in polymers generally and in cellulose in particular. However, in general, such processes have certain weaknesses inherent therein and accompanying disadvantages which detract from the overall efficiency. For example, certain disadvantages have been experienced with respect to limited stability of solutions from which the reagents are applied and also undesirable changes obtained in the products as a result of the treatment, such as discoloration or excessive loss in strength.

One particularly undesirable defect of some previously employed processes for the chemical modification of polymeric materials resides in the limitations in the chemical resistance of the new bonds formed in the molecules of the polymer which reduce the usefulness of the modified polymeric material.

Accordingly, it is the object of the present invention to provide a method for the chemical modification of polymers containing active hydrogen atoms in the polymeric molecule which avoids the shortcomings and disadvantages of prior known methods and compositions for such purposes.

It is a further object of the invention to provide a method for the chemical modification of polymers containing active hydrogen atoms in the polymeric molecules, which is capable of imparting desirable properties to the polymers without substantial limitation in the chemical resistance of the new bonds that are formed.

It is a further object of the present invention to provide a method for the chemical modification of polymers containing active hydrogen atoms in order to enhance their physico-chemical properties which avoids the shortcomings of the prior known methods and compositions.

It is a further object of the present invention to provide a method for the chemical modification of cellulosic textiles in order to enhance their dimensional stability, crease recovery and flat drying properties by the formation of stable chemical bonds.

It is a further object of the present invention to provide chemically modified polymeric materials which have improved properties including satisfactory chemical resistance.

It is a further object of the present invention to provide chemically modified cellulosic materials which have improved physico-chemical properties and satisfactory chemical resistance.

It is a further object of the present invention to provide modified cellulosic textiles having improved dimensional stability, enhanced crease recovery and flat drying properties.

In attaining the above objects, one feature of the present invention resides in treating the polymeric materials containing active hydrogen atoms with sulfonamide compounds capable of reacting with the active hydrogen atoms present in the polymeric molecule.

A further feature of the present invention resides in treating cellulosic polymers with certain reactive sulfonamide compounds which are capable of reacting with hydroxyl groups of the cellulosic materials to produce a chemically modified material having satisfactory chemical resistance.

A further feature of the present invention resides in the treatment of polymeric materials with symmetrical polyfunctional sulfonamide compounds whereby the polymers containing active hydrogen atoms are crosslinked to produce a chemically modified material in which new stable chemical bonds are formed.

A further feature of the present invention resides in the stepwise modification of polymers containing active hydrogen atoms with unsymmetrical polyfunctional sulfonamide compounds to produce chemically modified materials in which new stable chemical bonds are formed.

A further feature of the present invention resides in polymeric materials which have been chemically modified by introducing certain groups into the polymeric molecules by which desirable properties are obtained in the chemically modified polymeric materials.

A further feature of the present invention resides in cedllulosic ethers which are obtained according to the processes described herein and which are characterized by desirable properties imparted by certain chemical moieties that are introduced into the cellulolsic molecule.

Further objects, features and advantages of the present invention will become apparent from the following detailed description thereof.

It has now been found according to the present invention that polymers containing active hydrogen atoms in the polymeric molecule can be modified in a desirable manner with a certain group of reactive sulfonamide compounds. The processes of the present invention are superior to processes previously known in the art and are capable of producing products of outstanding characteristics. According to one feature of the present invention, cellulosic polymers in any form, such as textiles, can be treated with the reactive sulfonamide compounds to produce dimensionally stable products having improved wash and wear properties.

In the modification of polymers containing active hydrogen atoms in the polymeric molecule according to the present invention, the sulfonamide compounds utilized are characterized by at least one reactive group of the formula:

More specifically, the sulfonamide reagents may be represented by the generic formula:

(I) 

and (II) 

wherein Y is selected from the group consisting of

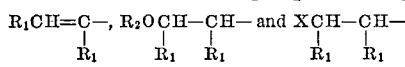

wherein $R_1$ is a member selected from the group consisting of hydrogen and lower alkyl groups, $R_2$ is a member selected from the group consisting of hydrogen and lower alkyl, X is the conjugate base of a Lowry-Bronsted acid which has a dissociation constant in water between $5 \times 10^{-2}$ and $5 \times 10^{-5}$, R is a member selected from the group consisting of hydrogen, alkyl, hydroxyalkyl and alkoxyalkyl, Q represents substituted and unsubstituted aliphatic and alicyclic groups, and D is a part of a heterocyclic ring of which the nitrogen atom is also a part and which heterocyclic ring may be substituted or unsubstituted.

Compounds which come within the scope of Formula I given above include polyfunctional sulfonamide compounds represented by the structural formula:

(III) 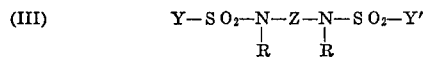

wherein Y and Y' are members selected from the group consisting of

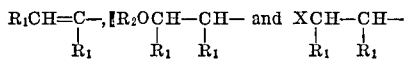

wherein $R_1$ is a member selected from the group consisting of hydrogen and lower alkyl; i.e. 1 to 5 carbon atoms, $R_2$ is a member selected from the group consisting of hydrogen and lower alkyl, X is the conjugate base of a Lowry-Bronsted acid which has a dissociation constant in water between $5 \times 10^{-2}$ and $5 \times 10^{-5}$, R is a member selected from the group consisting of hydrogen, lower alkyl from 1 to 5 carbon atoms, hydroxyalkyl, e.g. —CH$_2$OH, —CH$_2$CH$_2$OH, and alkoxy alkyl, e.g. —CH$_2$OCH$_3$, —CH$_2$CH$_2$OC$_2$H$_5$, and Z is a divalent aliphatic or alicyclic group and is selected from the group consisting of alkylene groups of the formula:

wherein $n$ is an integer with a value of 1 to 10, polyoxyethylene groups of the formula:

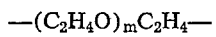

wherein $m$ is an integer with a value of 1 to 20, polyoxypropylene groups with the formula:

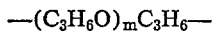

in which $m$ is an integer with a value of 1 to 20, and hydroxyalkylene groups of the formula:

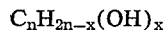

wherein $n$ has a value of 3 to 10 and $x$ has a value of 1 to 4, e.g.

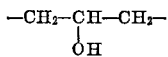

Heterocyclic compounds represented by Formula II above include compounds represented by the structural formula (IV) 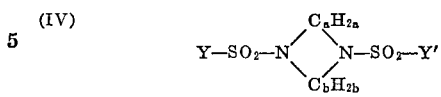

wherein Y and Y' have the meaning previously given above and $a$ and $b$ are integers with a value of 1 to 6. The heterocyclic ring can be substituted or unsubstituted.

Further compounds which come within the scope of Formula II above are trifunctional sulfonamide compounds represented by the structural formula:

(V) 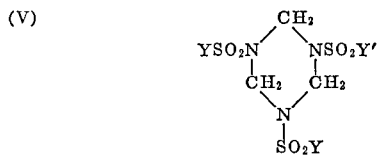

wherein Y and Y' have the meaning given above.

Unsymmetrical polyfunctional compounds which come within the Formula I can be represented by the structural formula:

(VI) 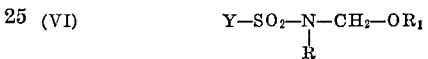

wherein Y, R and $R_1$ have the meanings previously given above.

In these compounds the N-methylol grouping

is capable of reaction with active hydrogen-containing polymers under certain coditions while the reactive grouping Y as defined above will react with the polymers under a different set of reaction conditions. For example, in general, the reactive groups Y identified above will react under alkaline conditions whereas the N-methylol groupings —CH$_2$OR$_1$ will react under acidic conditions. Because of these factors, the unsymmetrical compounds above are particularly valuable for the step-wise modification of cellulosic textiles.

Other unsymmetrical polyfunctional compounds included by generic Formulae I and II are compounds wherein the radical Q and D contain a reactive grouping other than

such as, for example, a grouping represented by the structural formula

wherein the reactivity differs from that of the

grouping.

Monofunctional compounds included among the compounds represented by Formula I which contain groups capable of imparting desirable properties to polymers which are reacted with the sulfonamide compounds are represented by the structural formula:

(VII) 

wherein Y and R have the same meaning previously given above, and $R_3$ is a member selected from the group consisting of substituted and unsubstituted aliphatic hydrocarbon groups containing, for example, from 8 to 20 carbon atoms. Examples include —C$_{18}$H$_{37}$, —C$_{10}$H$_{21}$ and the like. Hydrophobic substituents such as fluoroalkyl groups of the formula

wherein $n$ has a value of 8 to 20 and $x$ has a value of 2 to 41; e.g. —C$_{10}$H$_{10}$F$_{11}$, are particularly valuable for the chemical modification of cellulosic textiles in order to impart water repellency.

Further monofunctional compounds included among the compounds represented by Formula II are heterocyclic compounds represented by the structural formula:

(VIII)       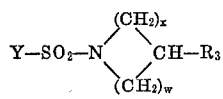

wherein

Y and $R_3$ have the meaning previously given above, and $x$ and $w$ are integers with a value of 1 to 3.

The group X which forms a part of the terminal grouping of certain of the sulfonamides of the present invention is defined as the conjugate base of a Lowry-Brønsted acid and has a dissociation constant in water between $5\times 10^{-2}$ and $5\times 10^{-5}$ and includes polar residues derived from a reagent of weak nucleophilic character.

Included and illustrative of these polar residues but non-limiting thereof are the following groupings:

Sulfate $-OSO_3M$

Thiosulfate $-SSO_3M$

Formate $-OCOH$

Pyridinium $-\overset{+}{N}C_5H_5$

Benzyldimethyl ammonium 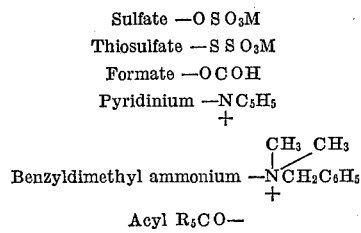

Acyl $R_5CO-$ where $R_5$ contains 1 to 5 carbon atoms, e.g. acetate $-OSOCH_3$, propionate $-OCOC_2H_5$, wherein M is an alkali metal, e.g. Na, K, Li, or ammonium.

Illustrative of the sulfonamide compounds of the present invention and included by the various formulae defined above are the following:

TABLE I

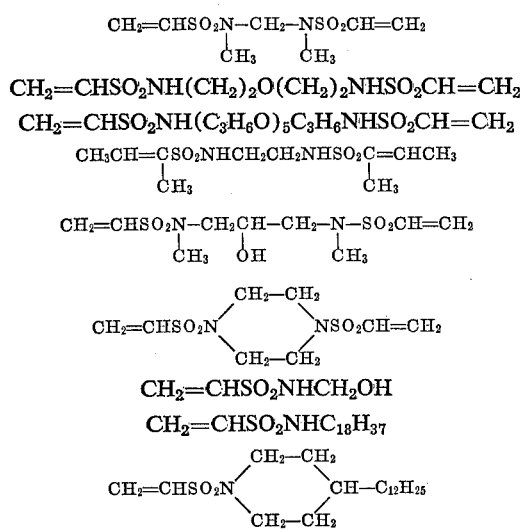

The above compounds are illustrative of the compounds of the present invention and not limiting in the scope thereof. It is understood that the various substituent groupings can be substituted one for another into the various generic Formulae I through VIII to obtain further compounds that can be employed for purposes of the present invention.

The compounds that can be employed according to the present invention are described in greater detail including methods for preparing the compounds of the formulae set forth above in applicant's copending application Ser. No. 337,997, filed Jan. 16, 1964, now abandoned, the complete disclosure of which is incorporated herein by reference and the applicant's co-pending application Ser. No. 301,875, filed Aug. 16, 1963, now abandoned, the complete disclosure thereof being incorporated herein by reference.

Among the polymers containing active hydrogen atoms, as determined by the Zerewitinoff method, in the polymeric molecule which can be modified according to the methods of the present invention are cellulose, regenerated cellulose, linen, starch, polyvinyl alcohol and other polymers in which the active hydrogen atom is present in the molecule in the form of hydroxyl groups, as well as polyamines, polyamides and polypeptides. The modification of cellulosic polymers and, in particular, cellulose in the form of yarns and textile fabrics with the reactive sulfonamide compounds of the above formulae offers many advantages because the properties of the cellulosic materials can be greatly improved as a result of the reaction with the sulfonamides according to the methods of the present invention.

The crosslinking reacting which takes places on cellulose with polyfunctional symmetrical sulfonamides can be represented, for example, by Equation 1.

(1) 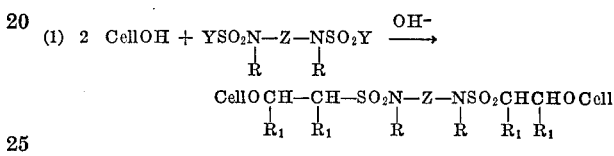

wherein CellOH represents a cellulose molecule, the symbols Y, R and $R_1$ have the meaning defined above and Z represents a divalent aliphatic or alicyclic group.

Many methods can be employed for applying the sulfonamide compounds to the polymer-containing active hydrogen atoms. For example, when the polymer is in the form of a textile material such as a cellulosic fabric the reagent can be most conveniently applied in the form of a solution by spraying, dipping, padding or the like. Excess solution is squeezed out, for example, by passing the fabric through pad rolls or by centrifuging.

The alkaline catalyst that is required for the reaction can be added to the crosslinking reagent solution and hence supply it to the polymer simultaneously with the sulfonamide compound or it may be applied to the polymer in separate steps which can precede or follow application of the crosslinking reagent.

Generally, the reaction is carried out for a few seconds to a few minutes at temperatures ranging from about 200° F. to about 350° F. although this temperature can be varied and the reaction can proceed to produce good yields of product at ambient temperatures in a few hours. Of course, the duration of the heating and the temperature at which the reaction is carried out can be varied as desired.

Among the alkaline compounds that are effective in catalyzing the crosslinking reaction are the acetate, bicarbonates, carbonates, hydroxides, alkoxides, phosphates and metasilicates of alkali metals such as sodium, potassium and lithium. Organic bases of equivalent strength such as tertiary amines and quarternary ammonium hydroxides can also be employed providing their boiling point is higher than the reaction temperature employed to carry out the reaction. In general, compounds providing a pH above about 7.5 in a 1.0 normal aqueous solution are effective for purposes of the present invention.

The concentration of the catalyst can vary from about 0.3% to about 10% by weight based on the weight of the polymer treated, although these ranges can be varied and depends on the structure of the reagent as well as on the base strength of the alkaline compound used.

Various sources of heat can be employed for the curing steps such as steam, forced draft ovens, radiant heating or any other conventional means commonly employed in the textile industry.

The concentration of the crosslinking agent employed is not a critical feature and can vary within wide limits. The required amount will depend on the particular textile material treated, on the structure of the reagent itself an on the properties desired in the modified end product.

Generally, the reagent can vary from about 5% to about 25% although these concentrations can be varied.

Generally, it is suitable to apply the reagent in a solvent, and for this purpose any suitable solvent can be used including water, dimethyl formamide and the like.

According to the present invention another feature by which particularly useful and desirable properties can be imparted to a polymer containing active hydrogen atoms resides in a stepwise chemical modification employing unsymmetrical polyfunctional reactive sulfonamides. One functional group of the unsymmetrical sulfonamide compound reacts under one set of conditions, as for example in the presence of an acid catalyst, and the remaining functional groups of the sulfonamide compound reacts under a different set of reaction conditions, as for example in the presence of an alkaline catalyst. This can be best illustrated by considering a representative unsymmetrical sulfonamide compound such as:

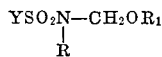

wherein one functional group, namely, $-OR_1$, reacts under acid conditions of catalysis and the remaining group, namely, Y, reacts under alkaline conditions of catalysis. As applied to the modification of cellulosic molecules, the unsymmetrical polyfunctional sulfonamide compounds are particularly useful where it is desired to crosslink the cellulosic material in a stepwise manner. This is shown in Equations 2 and 3 below.

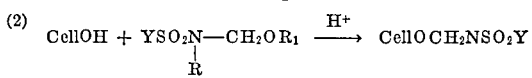

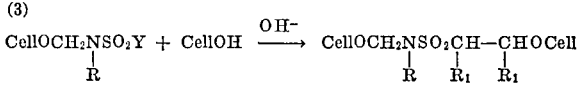

The various symbols in the foregoing equations have the same meaning as given above in Formula I.

In the reaction illustrated in Equation 2 above, the catalyst employed is any suitable acid catalyst such as nonvolatile organic acids including oxalic acid and the like. Ammonium salts such as ammonium chloride and ammonium nitrate can be used as well as amine hydrochlorides, amine nitrates, metal salts such as magnesium chloride, zinc chloride, zinc nitrate, aluminum chloride, salts of Lewis acids; e.g. zinc fluoroborate, boron trifluoride and the like.

It has further been found according to the present invention that monofunctional reactive sulfonamide compounds containing a hydrophobic radical can be employed to impart durable hydrophobic properties to polymers. The reaction of a cellulose material with a monofunctional compound is represented in Equation 4.

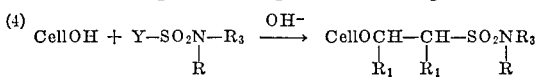

wherein $R_3$ represents a hydrophobic radical such as $C_{18}H_{37}$, $-C_{10}H_{10}F_{11}$ and the like.

An outstanding characteristic of the present invention is that the modified polymeric material, and particularly the chemically modified cellulosic materials are highly resistant to hydrolysis in both acid and alkaline medium.

The following examples are considered as illustrative of the present invention and are not considered limiting thereof in any way.

The test results shown in the examples were obtained according to the following procedures:

Crease Recovery-Monsanto Method-AATCC-66-1959.
Tensile Strength-Ravel Strip Method-ASTM D-39-59.
Tear Strength-Elmendorf Method-ASTM D-1424-59.
Shrikage-AATCC-96-196-T.

EXAMPLE I

Eight samples of 80 x 80 cotton print cloth were padded with a 10% solution of 1,4 bis vinyl sulfonyl piperazine in dimethyl formamide at 75% wet pickup, and dried. Each sample was then padded with an aqueous alkaline catalyst solution and allowed to react as shown in the table below. The increase in weight obtained for each set of reaction conditions, after thoroughly washing the samples to remove unreacted material, is shown in the table below.

| Sample | Catalyst solution | Reaction time and temperature | Percent weight gain |
| --- | --- | --- | --- |
| A1 | 2% NaOH | 5 min. at 300° F | 1.8 |
| A2 | 2% NaOH | 5 min. at 325° F | 2.9 |
| A3 | 2% NaOH | 24 hrs. at R.T | 2.5 |
| B3 | 4% NaOH | 24 hrs. at R.T | 2.7 |
| C1 | 3.3% KHCO$_3$ | 5 min. at 300° F | 2.6 |
| C2 | 3.3% KHCO$_3$ | 5 min. at 325° F | 3.0 |
| D1 | 2.3% K$_2$CO$_3$ | 5 min. at 300° F | 2.5 |
| D2 | 2.3% K$_2$CO$_3$ | 5 min. at 325° F | 3.1 |
| Control | None | | None |

All treated samples had improved crease recovery with respect to the untreated control.

EXAMPLE II

Four samples of 80 x 80 cotton print cloth were padded with aqueous solutions of alkaline catalysts as shown in the table below and dried. Each sample was then padded with a 12% solution of 1,4 bis vinyl sulfonyl-2 methyl piperazine in dimethyl formamide at 100% wet pickup, allowed to react under the conditions shown in the table below, and thoroughly washed. The reaction yield obtained and tabulated below was calculated from the nitrogen and sulfur content of the treated samples. The outstanding crease recovery obtained as a result of the treatment is shown in the table.

| Sample | Catalyst solution | Reaction conditions | Percent yield | Crease recovery W + F Dry | Crease recovery W + F Wet |
| --- | --- | --- | --- | --- | --- |
| A | 3.8% KHCO$_3$ | Curing 5 min. at 300° F. | 71 | 267 | 250 |
| B | 3.8% KHCO$_3$ | Steaming 5 min | 95 | 259 | 279 |
| C | 2.6% K$_2$CO$_3$ | Curing 5 min. at 300° F. | 72 | 277 | 233 |
| D | 2.6% K$_2$CO$_3$ | Steaming 5 min | 97 | 260 | 271 |
| Control | None | | | | |

EXAMPLE III

The exceptional chemical resistance of the bonds formed in the reaction between cotton cellulose and the bifunctional sulfonamide employed in Example II was demonstrated in the following experiment:

A cotton sample was treated with a 2.5% aqueous solution of K$_2$CO$_3$ and dried. It was then padded with a 10% solution of the reagent in dimethylformamide, steamed for 5 minutes and washed. The weight increase was 8.0%. The sample was then divided into four portions. One portion was retained as control. The other three were exposed to severe chemical treatments in order to determine the loss in weight and loss increase recovery, if any, resulting from exposure to acid, alkali and solvent. The results obtained are tabulated below.

| Treated sample | Chemical treatment | Percent weight loss after chemical treatment | Crease recovery W + F Dry | Crease recovery W + F Wet |
| --- | --- | --- | --- | --- |
| A | None | | 244 | 247 |
| B | Refluxing dimethyl formamide 2 hrs. | 0.62 | 242 | 239 |
| C | 0.5 N H$_2$SO$_4$ 3 hrs. at 160° F | 0.37 | 247 | 260 |
| D | 0.5 N NaOH 3 hrs. at 160° F | 1.22 | 231 | 246 |

It is indeed surprising to find that the stability of the bonds formed to alkaline hydrolysis (Sample D) and to acid hydrolysis (Sample C) is almost equally good.

EXAMPLE IV

Samples of rayon challis fabric were treated as described for cotton samples in Example II. Comparable improvements in crease recovery were obtained, and the warp shrinkage of the fabric after 5 launderings at 140° F. was wound to be only 2.5%, compared to 17.6% for a control sample.

EXAMPLE V

Samples of 80 x 80 cotton print cloth were treated with a 3.2% solution of $K_2CO_3$ and dried. Each sample was then padded with a 12% solution of *1,3,5 tris vinyl sulfonyl-hexahydro-s-triazine* in a water/dimethyl formamide mixture and heated as indicated in the table below. The samples were then washed, and the weight increase was determined. Reaction yields were calculated from the weight increase.

| Sample | Reaction conditions | Reaction yield, percent |
|---|---|---|
| A | Curing 5 min. at 300° F | 72 |
| B | Steaming 2 min | 70 |
| C | Steaming 10 min | 39 |

When the sequence of steps was reversed, and the reagent solution was applied first, followed by the aqueous catalyst solution, the yields were slightly lower (39–58%).

In the treatment of cellulosic textiles according to the new methods as described in the present invention, it is often desirable to employ additional finishing agents in order to impart other desirable functional properties. For example, softeners, hand builders, pigments, dyestuffs and stain repellents can be added to the treated solution whenever the mixture containing the added chemicals proves to be sufficiently stable. The addition of chemically inert materials, such as polyolefins, acrylic resins, or pigments does not generally affect the reaction between the cellulose and the sulfonamides. The addition of materials containing reactive groups, such as selected dyes or sizing materials, to treating solutions containing polyfunctional sulfonamides results in a desirable reaction in which the sulfonamide acts as a chemical bridge between the cellulose and the added compound. In this matter, dyes and sizing compounds can be bonded to cellulose in a durable manner, while simultaneously crosslinking cellulosic molecules with the polyfunctional sulfonamide compounds.

It is to be understood that cellulosic textile materials as referred to herein is intended to include materials such as fabrics containing blends of cellulosic fibers with non-cellulosic fibers, e.g. cotton and a polyester.

It is understood that various other modifications will be apparent to and can readily be made by those skilled in the art without departing from the scope and spirit of this invention. Accordingly, it is not intended that the scope of the claims appanded hereto be limited to the description set forth herein but rather that the claims be construed as encompassing all the features of patentable novelty which reside in the present invention including all features which would be treated as equivalents thereof by those skilled in the art to which the invention pertains.

What is claimed is:

1. A method for the chemical modification of polymers containing active hydrogen atoms, as determined by the Zerewitinoff method, in the polymer molecule which comprises reacting said polymer in the presence of an alkaline catalyst with a sulfonamide compound represented by the structural formula

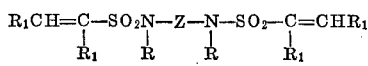

wherein $R_1$ is a member selected from the group consisting of hydrogen and lower alkyl, R is a member selected from the group consisting of hydrogen, alkyl, hydroxyalkyl and alkoxyalkyl, and Z is a member selected from the group consisting of alkylene groups having the formula

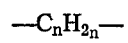

wherein $n$ is an integer with a value of 1 to 10, polyoxyethylene radicals with the formula

wherein $m$ is an integer with a value of 1 to 20 polyoxypropylene groups of the formula

wherein $m$ is an integer with a value of 1 to 20, and hydroxyalkylene radicals of the formula

wherein $n$ is an integer with a value of 3 to 10 and $x$ is an integer with a value of 1 to 4

2. The method as defined in claim 1 wherein the sulfonamide is

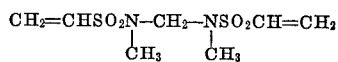

3. The method as defined in claim 1 wherein the sulfonamide is

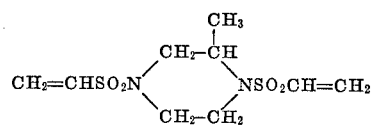

4. The method as defined in claim 1 wherein the sulfonamide is 1,3,5-tris vinyl sulfonyl-hexahydro-s-triazine.

5. A method for the stepwise chemical modification of polymers containing active hydrogen atoms, as determined by the Zerewitinoff method, in the polymeric molecule which comprises reacting the said polymer with a sulfonamide compound represented by the structural formula:

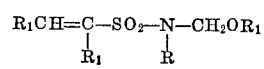

wherein $R_1$ is a member selected from the group consisting of hydrogen and lower alkyl, R is a member selected from the group consisting of hydrogen, alkyl, hydroxyalkyl and alkoxyalkyl, wherein in one step, the polymer is treated in the presence of an acid catalyst whereby one functional group of the above sulfonamide compound reacts with the hydrogen atoms of said polymer, and in another step, and in the presence of an alkaline catalyst, the remaining functional group of the above sulfonamide compound reacts with the remaining active hydrogen atoms of the polymer.

6. A method for the chemical modification of polymers containing active hydrogen atoms, as determined by the Zerewitinoff method, in the polymeric molecules comprising reacting said polymer in the presence of a catalyst for the reaction with a sulfonamide compound represented by the structural formula:

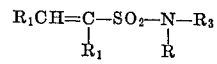

wherein $R_1$ is a member selected from the group consisting of hydrogen and lower alkyl, R is a member selected from the group consisting of hydrogen, alkyl, hyroxyalkyl, and alkoxyalkyl, and R is a member selected from the group consisting of substituted and unsubstituted aliphatic hydrocarbon groups containing from 8 to 20 carbon atoms.

7. A method for the chemical modification of polymers containing active hydrogen atoms, as determined by the Zerewitinoff method, in the polymeric molecule which comprises reacting said polymer in the presence of a catalyst for the reaction with a sulfonamide compound having the structural formula:

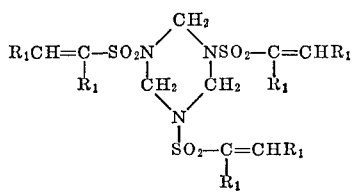

wherein $R_1$ is a member selected from the group consisting of hydrogen and lower alkyl.

References Cited
UNITED STATES PATENTS

| | | | |
|---|---|---|---|
| 2,524,399 | 10/1959 | Schoene et al. | 260—212 |
| 3,044,989 | 7/1962 | Shivers | 260—79.3 |
| 3,068,123 | 12/1962 | Feldmann | 260—79.3 |
| 3,153,021 | 10/1964 | Tashlick | 260—79.3 |
| 3,184,447 | 5/1965 | Paquette | 260—239 |
| 3,345,346 | 10/1967 | Reynolds | 260—79.3 |
| 3,351,618 | 11/1967 | Basel et al. | 260—79.7 |
| 3,414,367 | 12/1968 | Welch et al. | 8—116.2 |

DONALD E. CZAJA, Primary Examiner

R. W. GRIFFIN, Assistant Examiner

U.S. Cl. X.R.

8—16.2; 260—17 R, 79.3 R, 91.3 UA, 233.3 R